US009111449B2

(12) United States Patent
Cecchet

(10) Patent No.: US 9,111,449 B2
(45) Date of Patent: Aug. 18, 2015

(54) METHOD AND SYSTEM FOR DETERMINING THE STATE OF OCCUPATION OF A PLURALITY OF SCHEDULED AREAS BY VEHICLES

(75) Inventor: Marco Cecchet, Milan (IT)

(73) Assignee: FM S.R.L., Genoa (IT)

( * ) Notice: Subject to any disclaimer, the term of this patent is extended or adjusted under 35 U.S.C. 154(b) by 147 days.

(21) Appl. No.: 13/808,525

(22) PCT Filed: Jul. 5, 2010

(86) PCT No.: PCT/IT2010/000294

§ 371 (c)(1), (2), (4) Date: Jan. 4, 2013

(87) PCT Pub. No.: WO2012/004816

PCT Pub. Date: Jan. 12, 2012

(65) Prior Publication Data

US 2013/0106621 A1 May 2, 2013

(51) Int. Cl.

| | |
|---|---|
| ***G08G 1/00*** | (2006.01) |
| ***G07B 15/00*** | (2011.01) |
| ***B60Q 1/26*** | (2006.01) |
| ***G07B 15/02*** | (2011.01) |
| ***G08G 1/14*** | (2006.01) |

(52) U.S. Cl.

CPC . *G08G 1/146* (2013.01); *G08G 1/14* (2013.01)

(58) Field of Classification Search

None

See application file for complete search history.

(56) References Cited

U.S. PATENT DOCUMENTS

| | | | | |
|---|---|---|---|---|
| 5,432,508 | A * | 7/1995 | Jackson | 340/932.2 |
| 6,147,624 | A * | 11/2000 | Clapper | 340/932.2 |
| 6,340,935 | B1 * | 1/2002 | Hall | 340/932.2 |
| 6,970,101 | B1 * | 11/2005 | Squire et al. | 340/932.2 |
| 7,026,954 | B2 * | 4/2006 | Slemmer et al. | 340/932.2 |
| 7,135,991 | B2 * | 11/2006 | Slemmer et al. | 340/932.2 |
| 7,701,361 | B2 * | 4/2010 | Lee et al. | 340/932.2 |
| 2004/0252034 | A1 * | 12/2004 | Slemmer et al. | 340/932.2 |
| 2005/0190076 | A1 * | 9/2005 | Howard et al. | 340/932.2 |
| 2005/0280555 | A1 * | 12/2005 | Warner | 340/932.2 |
| 2006/0170566 | A1 * | 8/2006 | Slemmer et al. | 340/932.2 |
| 2006/0212344 | A1 * | 9/2006 | Marcus et al. | 705/13 |
| 2009/0027231 | A1 * | 1/2009 | Lee et al. | 340/932.2 |
| 2014/0172518 | A1 * | 6/2014 | King et al. | 705/13 |

FOREIGN PATENT DOCUMENTS

| | | | |
|---|---|---|---|
| WO | 2006067813 | A1 | 6/2006 |
| WO | 2008061540 | A1 | 1/2012 |

* cited by examiner

*Primary Examiner* — Julie Lieu

(74) *Attorney, Agent, or Firm* — King & Schickli, PLLC

(57) ABSTRACT

A method for determining the state of occupation of a plurality of scheduled areas by vehicles, comprising the steps of: associating with each area to be monitored a transmitter which periodically transmits a signal of fixed power; receiving in a concentrator the plurality of signals emitted by said plurality of transmitters; examining said plurality of signals and determining the occupied/vacant state of each area to be monitored; periodically transmitting a signal comprising information on the occupied/vacant state of each monitored area to an operating center; generating information indicative of the state of occupation of a plurality of areas.

9 Claims, 1 Drawing Sheet

METHOD AND SYSTEM FOR DETERMINING THE STATE OF OCCUPATION OF A PLURALITY OF SCHEDULED AREAS BY VEHICLES

This application is the national stage of PCT/IT2010/000294, filed Jul. 5, 2010.

FIELD OF THE INVENTION

The present invention relates to a method and system for determining the state of occupation (occupied/vacant) of a plurality of scheduled areas by vehicles.

In particular, the method and system of the invention are arranged to monitor the state of occupation of car parks, for example payment car parks located in cities, or parking spaces for the handicapped. Generally, in its various embodiments, the method and device of the invention can be conveniently used to monitor the state of occupation of areas such as carriageways, loading/unloading areas, etc.

BACKGROUND OF THE INVENTION

WO 2006/067813 describes an automatic system for monitoring and supervising the access, transit and parking of vehicles in predetermined controlled traffic zones, in particular in car parks provided with a plurality of individual parking spaces. The system comprises: an electronic vehicle identification device positioned on each vehicle, comprising a memory in which the data regarding the vehicle and/or the vehicle owner are memorized, and means enabling these data to be remotely transmitted; an electronic sensing device for the vehicle positioned in each parking space and provided with a suitable means for reading and memorizing the data present in each vehicle and means enabling these data to be remotely transmitted; at least one local data processing unit arranged to receive the information transmitted by the vehicle sensing devices, to process this information and to transmit the processed data; at least one central data processing unit, arranged to receive the information transmitted by the local data processing units, to further process the information and to further transmit the information to other processing units, in particular to data processing centres pertaining to banks or to similar financial institutions, or to directly emit signals enabling a vehicle to gain access to, to transit, or to park within the monitored zone; this automatic system is characterised in that the data transmitted by the vehicle electronic identification device are associated with the data relative to the electronic vehicle sensing device, the result of this association being transmitted to one of the local data processing units, the data processed by the local units being transmitted to the central processing unit, this latter generating a signal regarding the payment of a predetermined tariff for the access and/or transit and/or parking of a vehicle within the controlled zone. MI2008A001875, in the name of the Applicant, describes a system for verifying the state of occupation of a plurality of areas by vehicles, which comprises on board a vehicle a transmitting smart card arranged to transmit, to at least one first receiver-transmitter positioned within the area to be monitored, a first identification signal received from the vehicle.

The first receiver-transmitter is connected to a second receiver-transmitter to transmit the first identification signal and a second identification signal for the area monitored.

The second receiver-transmitter is connected to at least one electronic processor of an operating centre.

The electronic processor is arranged to receive the first identification signal and the second identification signal from the second receiver-transmitter, and to generate information indicative of the vehicle which has occupied the monitored area and of the particular area monitored.

SUMMARY OF THE INVENTION

The technical aim of the present invention is therefore to provide a more easily implemented and more versatile method and system for determining the state of occupation of a plurality of scheduled areas by vehicles. Another object of the invention is to provide a method and system which enable each abusive utilization of one or more parking spaces or other monitored area to be securely and rapidly identified.

A further object of the invention is to provide a method and system which are economical and enable parking services to be managed inexpensively.

The technical aim, together with these and further objects, are attained according to the present invention by a method and system for determining the state of occupation of a plurality of scheduled areas by vehicles.

BRIEF DESCRIPTION OF THE DRAWING FIGURES

Further characteristics and advantages of the invention will be more apparent from the description of a preferred but non-exclusive embodiment of the method and system for verifying the state of occupation of a plurality of scheduled areas by vehicles according to the invention, illustrated by way of non-limiting example in the accompanying drawings, in which.

DETAILED DESCRIPTION OF THE INVENTION

Figure 1:
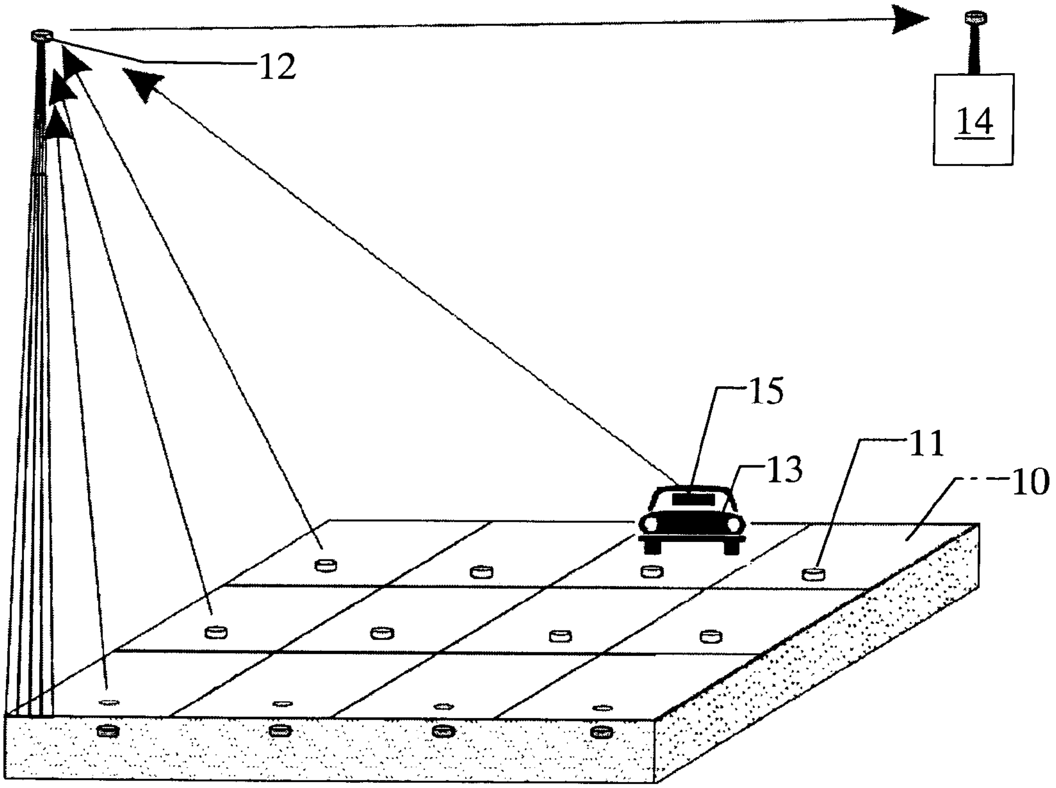
FIG. 1 is a schematic view of the system according to the invention.
Figure 2:
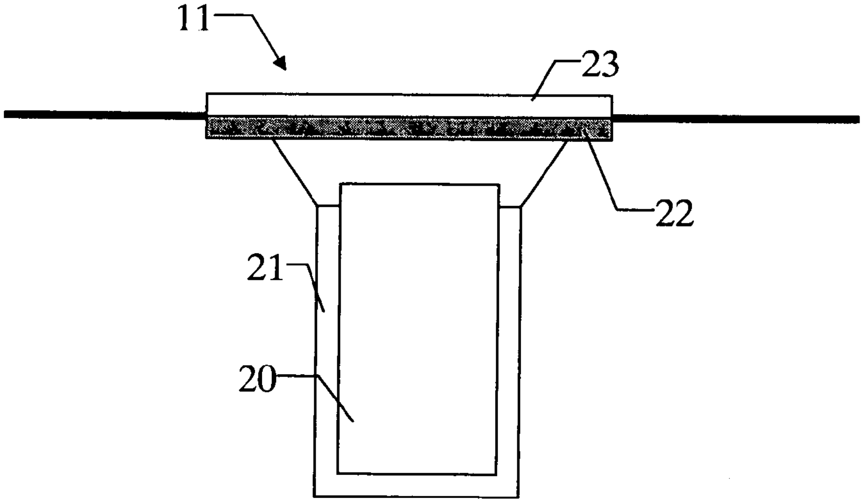
FIG. 2 shows a sensor used in the system of the invention.

With reference to said figures, a system for verifying the state of occupation of a plurality of scheduled areas by vehicles comprises a plurality of parking spaces, in each parking space 10 a sensor 11 being located below the wearing course of the parking space 10.

A plurality of sensors 11 are coordinated by a concentrator 12 (communication node or bridge) for the parking area 10, which sees the sensors 11 and evaluates the signals originating from them.

The sensor 11 comprises the electric circuit 20 and a containing capsule 21. The capsule is buried, covered with a layer of asphalt 22 and then with an adhesive piece 23 to identify the position of the sensor 11. The electric circuit 20 is powered by a long-life battery (5 years).

The sensor 11, consisting simply of a transmitter, transmits periodically (for example every 5 seconds) a signal of fixed power containing certain minimum information, for example a number identifying the sensor 11, and possibly the state of the battery.

When a vehicle 13 enters a parking space 10, the signal transmitted by the sensor 11 positioned in that parking space 10 is altered.

The ground sensor 11 represents a simple network node which has two essential characteristics. It has a low power consumption level and a very simple functionality level, given that it transmits a signal to the node 12. When a metal mass halts in the parking space the signal is altered, i.e. attenuated.

The state of occupation can be determined precisely from the intensity of the received signal.

In this respect, using a low level algorithm (firmware), the node 12 is able to decide whether the car space is occupied. The totality of nodes 12 in fact forms a second network. The state of occupation is deduced by measuring the signals of the network consisting of the sensors 11.

In the node 12, the received signal intensity value is firstly filtered using a digital filter. The filtered signal is then passed to a threshold sensing algorithm.

An algorithm with a received signal intensity value of fixed threshold was used, for example a received signal reduction of 50% indicates the presence of a car in that position.

To determine the state of occupation an algorithm of variable threshold level is preferably used.

In this respect, as an alternative, a threshold level variable with time is possible, based on the environmental (radio) conditions.

In addition, digital filters can be used characterised by different parameters which can influence the transmitted signal.

The concentrator 12 receives the signals of all the sensors 11, then interprets the variation in the signals received, this resulting in recognition of the state of occupation of a parking space by a vehicle 13.

For very large car parks, many concentrators can be used. The concentrator 12 is installed, for example, on a street lighting column. This type of installation is the best from the point of view of positioning the 2.4 Ghz antenna of the coordinator of a ZigBee network.

The concentrator 12 is powered by batteries rechargeable for example by photovoltaic cells.

Having recognized the state of occupation of a parking space 10, the identity of the sensor/parking space and the time of occupation are memorized in the concentrator 12. When the state of occupation is recognized, a string is defined which basically includes the date, the time of occupation (i.e. unambiguous time information which associates the parking space with the time of occupation). Likewise when the vehicle leaves the occupied space, the concentrator senses that the space is again available and essentially assigns a date and time to the moment of leaving. Hence with each parking space a time table is associated carrying the times of occupation and leaving. This table defines the effective level of occupation of the parking space.

The concentrator 12 transmits periodically, for example every 3 minutes, the state of all parking spaces assigned to it, to a remote operating centre 14.

Each concentrator for the various parking spaces communicates with the remote operating centre 14, which will know the overall parking space occupation state and be able to indicate by suitable means the availability or non-availability of vacant parking spaces.

Preferably each vehicle 13 comprises a smart card 15 comprising a display, a switch, a memory in which the identification of the vehicle/owner is stored, and a transmitter which communicates with the concentrator 12. The smart card 15 does not communicate with the sensor 11 (the sensor is merely a transmitter).

The concentrator 12 transmits information to the smart card 15 regarding its own state, hence the smart card 15 also comprises a receiver.

The smart card 15 comprises rechargeable batteries (preferably of Li-polymer type) connectable to a battery charger; the smart card is also provided with a microcontroller which handles the communication steps with the concentrator 12.

The smart card 15 also presents an indicator activated by the recognition signal; for example the indicator consists of a coloured (green/red) LED which is activated by the microcontroller when the receiver-transmitter receives the recognition signal.

Advantageously, the smart card 15 also presents a biometric reader such as a digital fingerprint reader.

In this manner, when a user passes a finger across the digital fingerprint reader, correspondence with one or more stored fingerprints can be checked, to authorize parking, if positive.

The remote operating centre 14 communicates with the concentrator 12 to pass information regarding the smart card state.

When a vehicle 13 enters a parking space 10, the smart card 15 communicates with the concentrator 12.

Each smart card 15 communicates not with the local sensor 11, but only with the concentrator 12. By virtue of this architecture, a smart card with hardware and software is possible which essentially enables applications to be conceived which are very different from each other.

The smart card can essentially be related to a specific condition: for example a smart card can be associated with a person or vehicle for payment by subscription, as in the case of a smart card controlling parking by residents of a building.

Possible applications can differ on the basis of: type of user (elderly, disabled, pregnant women, etc.), user category (residents, paying persons) and monitored area (airport areas, proximity to bends, etc).

The method of operation is based on a smart card logic flow with acceptance of the occupation space.

When the vehicle 13 enters a parking area the concentrator 12 communicates all the vacant parking spaces of the area to the smart card 15.

When a vehicle 13 enters a parking space 10 and parks, the concentrator 12 views the smart card 15 and recognizes the state of occupation relative to a sensor 11, of the area effectively occupied.

The smart card 15 shows on a display the number of the parking spaces recently occupied, seeing that in a given instant more vehicles can enter and occupy respective vacant spaces.

From the spaces recently occupied, the user accepts the parking space effectively occupied, indicated for example by markings on the floor or by a card positioned on the side.

Acceptance is then for example confirmed by positioning the fingerprint on the reader.

Alternatively the system can be based on a smart card logic flow with automatic activation.

The state of occupation of the parking space 10 is automatically associated with the smart card 15, given that a time correspondence exists between the two signals. The analyzed concepts of time correspondence mean that the assigning is non-critical, even if overlapping exists in the arrival time. This is achieved by virtue of an assignment and release algorithm.

In this case the reserved parking spaces are associated, uniquely or in a proportion of one to many, with a person or a vehicle. Consequently, when faced with the occupation of a vehicle space, for example assigned to residents of a building, the system has to check whether the state of occupation corresponds to a valid association between the vehicle space and the smart card of the resident. The condition is that the smart card has been issued to a resident, who activates a confirmation of occupation of vehicle spaces which are associated in the system only with the smart card. When this event is activated, the system compares whether the smart card is authorized to park in the vehicle spaces associable with that smart card. If the available space is associated with the residents' smart card, a state of authorized occupation is issued, otherwise the supervising personnel are informed, to indicate the presence of unauthorized parking.

In this case a unique relationship must be configured between the smart card and the vehicle number plate or possibly the person, to determine that the occupation takes place effectively by authorized vehicles. Alternatively, it may be sufficient for the smart card to be associated with the parking space independently of whether the vehicle occupies the parking space. In this case the smart card can also be passed to different vehicles.

The remote operating centre 14 comprises an electronic processor carrying software able to receive data from the concentrator 12 and generate information indicative of the person or vehicle occupying the monitored area and of the particular area monitored.

This information can be used to generate a parking payment, for example via a bank.

Alternatively this information can be compared with data contained in a data base of the operating centre 14 to verify whether the person occupying the particular parking space or the particular area is authorized (for example whether inserted in the list of handicapped persons).

In a particular embodiment, all communications take place by means of ZigBee protocol.

ZigBee is known to be the name assigned to a set of high level communication protocols for low power digital radios based on the IEE 802.15.4 standard. These protocols enable a wireless Personal Area Network (PAN) to be constructed. ZigBee operates in the 2.4 GHz band with a pass band of 250 kbit/s. ZigBee technology enables PANs to be constructed more simply and less costly than other technologies, such as Bluetooth.

A ZigBee network typically enables applications to be implemented requiring a non-excessive pass band and a low power consumption and, in particular, with a maximum number of nodes equal to 65,000.

A ZigBee network is composed of three different node types.

ZigBee coordinator (ZC): this is the device which forms the basis of the network and can act as a bridge towards other networks. In each ZigBee network only one ZC is present. The ZC is able to memorize data relative to the network structure, including data cryptography keys.

ZigBee Router (ZR): this is the device which enables data to be passed from one node to another.

ZigBee End DEVICE (ZED): this is the device in minimum configuration. Its functionalities are reduced to the mere capacity to transfer data to ZRs or ZCs. A ZED cannot directly exchange data with another ZED: this can take place via a ZR node or directly via the ZC.

The ZigBee standard defines the interconnection protocol, via radio communication, through various devices falling within a Personal Area Network. WPANs (wireless PANs) are used to distribute information along relatively short distances without connection cables; connections made via WPANs relate to small environments or infrastructures, favouring the development of inexpensive and energy efficient solutions for a wide range of applications.

A WPAN can include two different types of device: FFD (Full Function Device) and RFD (Reduced Function Device). A device of the first type can operate within the network in three ways: by operating as a network coordinator, as a simple coordinator or, more typically, as a communication terminal. An FFD can dialogue with other devices of both categories, whereas an RFD can communicate directly only with an FFD.

In each network, only one of the nodes can be configured as a ZC coordinator, used to initiate, terminate and handle communication between the different peripherals. Depending on the particular application, a WPAN can be configured as two possible types: star or peer-to-peer. In either case, each device within the network possesses an extended 64 bit address, which is used as a universal address, a unique identifier for the device, and different from all other devices of the world; this address can be directly used for communication or, alternatively, an address reduced by 2 bytes can be used, unique for the network to which the devices are connected, attributed by the ZC coordinator each time the device is sensed by it. The network topology used to handle the parking services of the present invention is of star type.

A single FFD exists acting as ZC coordinator and is physically located at the concentrator 12. The nodes formed by the sensors 11 communicate directly with the concentrator 12.

The operation of the system according to the invention is apparent from that described and illustrated, and is substantially as follows.

It will be assumed that a determined parking space is initially vacant; in this situation the receiver-transmitter 11 periodically transmits a signal to the concentrator 12 which is able to determine the presence or absence of a vehicle on the monitored area based on the intensity of the received signal.

In practice, the sensor 11 transmits to the concentrator 12 a signal having a predetermined power; if the monitored parking space is vacant the concentrator 12 receives a signal of power S1, whereas if it is occupied the concentrator 12 receives a signal of power S2, where the power S1 is greater than S2.

By comparing the received power the ZigBee module is able to evaluate whether and when a parking space has been occupied; this comparison is made at the concentrator 12 or at the operating centre 14. In practice the comparison and the recognition of the "vacant" or "occupied" state of the parking space is made by software constituting means for sensing the state of occupation of the area being monitored.

The concentrator 12 itself periodically communicates with the operating centre 14 via a suitable receiver, by indicating the "vacant" or "occupied" state of the parking space.

If this comparison is positive, i.e. if the first signal identifying the person or vehicle is recognized, the operating centre 14 transmits a recognition signal to the concentrator 12 and to the smart card 15; this signal causes the LED to light, confirming that the user has been recognized.

If the signal is not recognized, a sanction procedure is activated whereby the policing authorities are automatically informed, who then apply a sanction or remove the vehicle.

If monitoring payment car parks, these data are associated by the operating centre 14 with a time reference.

As the concentrator 12 and the operating centre 14 communicate with each other periodically, for example every 5 minutes, or every minute, or every 30 seconds, the electronic processor is able to know almost in real time the moment in which the parking space is occupied and the moment in which it is left vacant.

Consequently on the basis of the data in its possession, the electronic processor is able to emit an invoice to be pair for example by post, or (preferably) is able to initiate an automatic payment procedure via credit card, debit card or by other means.

The invention claimed is:

1. A method for determining a state of occupancy of a plurality of scheduled areas by vehicles, comprising the steps of:

associating with each of the plurality of scheduled areas to be monitored a transmitter which periodically transmits a signal of fixed power;

receiving in a concentrator each signal emitted by each of the transmitters;

examining each signal emitted by each of the transmitters and determining the occupied/vacant state of each of the plurality of scheduled areas to be monitored based upon monitoring a received signal intensity of each signal with a predetermined value, wherein the determining step includes defining the state of a first area as occupied when the intensity of the received signal of said first area is less than the predetermined value, and wherein the predetermined value varies with time;

periodically transmitting a signal by the concentrator comprising information on an occupied/vacant state of each of the plurality of scheduled areas to an operating centre; and generating information indicative of the state of occupancy of each of the plurality of scheduled areas.

2. A method as claimed in claim 1, characterised in that said fixed power signal comprises information identifying said transmitter.

3. A method as claimed in claim 1, characterised in that the step of determining the occupied/vacant state of each area to be monitored comprises the step of associating an end-of-parking time with said first area.

4. A method as claimed in claim 1, characterised by comprising the step of transmitting information indicative of the vehicle or of the driver to said concentrator.

5. A method as claimed in claim 4, characterised by comprising the step of authorizing parking if the information indicative of the vehicle or the driver is considered acceptable.

6. A method as claimed in claim 1, characterised in that the information generated by the operating centre is used to generate a payment for parking.

7. A method as claimed in claim 1, characterised in that the information generated by the operating centre is compared with the data contained in a data base by the operating centre to verify whether the person occupying the particular parking space or the particular area possesses authorization.

8. A method as claimed in claim 1, characterised in that the step of determining the occupied/vacant state of each area to be monitored comprises the step of associating an occupancy start time with each area and an occupancy finish time.

9. A method as claimed in claim 1, wherein the step of determining the occupied/vacant state of each area to be monitored includes utilizing a threshold sensing algorithm for monitoring the received signal intensity of each signal with the predetermined value.

* * * * *